United States Patent [19]

Nagata et al.

[11] Patent Number: 4,730,419
[45] Date of Patent: Mar. 15, 1988

[54] TABLE FEED APPARATUS

[75] Inventors: Tetsuya Nagata; Osamu Ohashi, both of Narashino, Japan

[73] Assignee: Seiko Seiki Kabushiki Kaisha, Chiba, Japan

[21] Appl. No.: 890,495

[22] Filed: Jul. 25, 1986

[51] Int. Cl.[4] .............................................. B24B 47/02
[52] U.S. Cl. ................................ 51/165.89; 74/571 R; 74/836; 51/34 K
[58] Field of Search ................. 74/836, 571 R, 571 L, 74/571 M; 51/165.93, 165.89, 165.88, 165.8, 34 C, 34 K

[56] References Cited

U.S. PATENT DOCUMENTS 3,375,732  4/1968  Voeller ................................ 74/571
4,043,080  8/1977  Maxwell ............................. 51/50 R

FOREIGN PATENT DOCUMENTS

653868  5/1951  United Kingdom ......... 51/103 WH

Primary Examiner—Harold D. Whitehead
Attorney, Agent, or Firm—Bruce L. Adams; Van C. Wilks

[57] ABSTRACT

A grinder wheel table feed apparatus converts rotation of a table driving motor into reciprocation movement of a grinder wheel table through a ball-screw mechanism to thereby impart a traverse movement to the grinder wheel table between a non-working position and a working position. The rotation of a reciprocation axle drive motor is converted through an eccentric cam into an oscillation movement of the grinder wheel table when the table is in its working position. A drive control system includes an encoder operable to read the rotational position of the reciprocal axle drive motor, and a control device effective to stop the eccentric cam at a predetermined eccentric angular position.

11 Claims, 6 Drawing Figures

TABLE FEED APPARATUS

BACKGROUND OF THE INVENTION

This invention relates to a table feed apparatus for reciprocating a table of grinder machines and the like.

For instance, in an internal grinder machine, there is mounted an oil-cylinder under the table thereof and by driving the oil-cylinder, the table is caused to rapidly transfer from a stand-by or non-working position to a working position (called a traverse movement) and by rotatably driving an eccentric cam assembly, which is provided at an end of a reciprocation axle protrudingly extending from the cylinder, a grinder wheel is caused to undergo a reciprocation movement (called an oscillation movement). In addition, in a conventional state of the art device, the eccentric cam assembly is comprised of a slide-ring mounted to undergo reciprocation, an eccentric cam slidably connected forwardly or backwardly of the transfer direction within the slide-ring, and a reciprocation axle for rotating the eccentric cam such that by rotatably driving the reciprocation axle, the eccentric cam exerts an eccentric movement and by slidably connecting to the inner side of the slide-ring, the table undergoes a reciprocation movement in response to the eccentric amount of the eccentric cam.

Further, the eccentric cam has a double ring configuration and an outer cam of which is connected to the inner wall of the slide-ring such that it constrains the traverse component force as well as possible and is adjustable only along the axial direction of the reciprocation axis. But, in the aforementioned table feed apparatus, an oil-cylinder is employed as a drive means for accomplishing the traverse movement such that it becomes impossible to exert a low speed feed to the workpiece. Thus the grinding versatility is very limited.

Further, with respect to the oscillation movement of the grinder table, the eccentric position of the eccentric cam is not so constant and thus the table is not accurately positioned. Accordingly, if the oscillation stroke needs to be changed, it is necessary to return the eccentric cam to the reference position and after that change the stroke thereof, hence the eccentric cam is troublesome in its stroke adjustment operation and its operation efficiency is very deteriorated.

Further, in a prior art table feed apparatus, when the operator needs to change the eccentric stroke of the eccentric cam, a control operation of the eccentric stroke is carried out in such a manner that an outer cam is caused to be free against an inner cam by unfastening an adjustment thread, and after the outer cam is rotated by the desired angle, the adjustment thread is again fastened. There are many times when this kind of manual operation becomes troublesome, for instance, when the oscillation operation of the table feed apparatus has a mechanical acceleration limit (vibration limit) such that if a long stroke is set, the oscillation cycle of the stroke or the rotation number of the eccentric cam is extremely restrained. Hence, in a practical operation, it is hard to cause an interlock therewith within the allowable range of the acceleration limit (vibration limit) under the consideration of the mutual relation between the oscillation stroke and the oscillation cycle. The manual operation is so difficult that it makes the stroke control operation more troublesome.

SUMMARY OF THE INVENTION

This invention has been made to overcome the aforementioned drawbacks. This invention is intended to provide a table feed apparatus which makes it possible to carry out both low speed feeding and high speed oscillation movement and to normally position the table to its accurate position when the oscillation movement is stopped and to provide a table feed apparatus that is extremely improved in operability, by executing an alternation of the oscillation stroke automatically.

This invention has been made in order to accomplish said objects and relates to a table feed apparatus which converts rotation of the table driving motor into reciprocation movement of the table through a ball-screw mechanism, which exerts a traverse movement to the table between a stand-by position and a working position, and in addition, which converts rotation of the reciprocation axle drive motor into reciprocal movement of the table through an eccentric cam, and which exerts an oscillation operation to the table in its working position. This invention is characterized in that the eccentric cam is comprised of a cam axle eccentrically extending along the reciprocation axle, a cam plate mounted to the cam axle, a cam block slidably connected to the outer surface of the cam plate, a slide-ring, and a clutch assembly which effects connection and disconnection between the cam axle and cam plate and which also converts rotation of the cam plate into an oscillation operation of the grinder wheel table through the cam block and slide-ring. An eccentricity adjustment of the eccentric cam is carried out by rotating the cam plate relative to the cam axle by a desired rotation angle. The drive control means of the eccentric cam is comprised of an encoder secured on a reciprocation axle drive motor so that it is possible to read the rotation angle of the motor, a measurement device for detecting the amount of eccentricity of the eccentric cam, and a control device for controlling rotation of the reciprocation axle drive motor. It is possible to operate the clutch assembly so as to connect or disconnect the cam plate with the cam axle and thereby to automatically alter the eccentric amount of the eccentric cam.

DETAILED DESCRIPTION OF THE INVENTION

Referring now to the drawings, embodiments of the invention will be detailedly explained with reference to the attached drawings.

Figure 1:
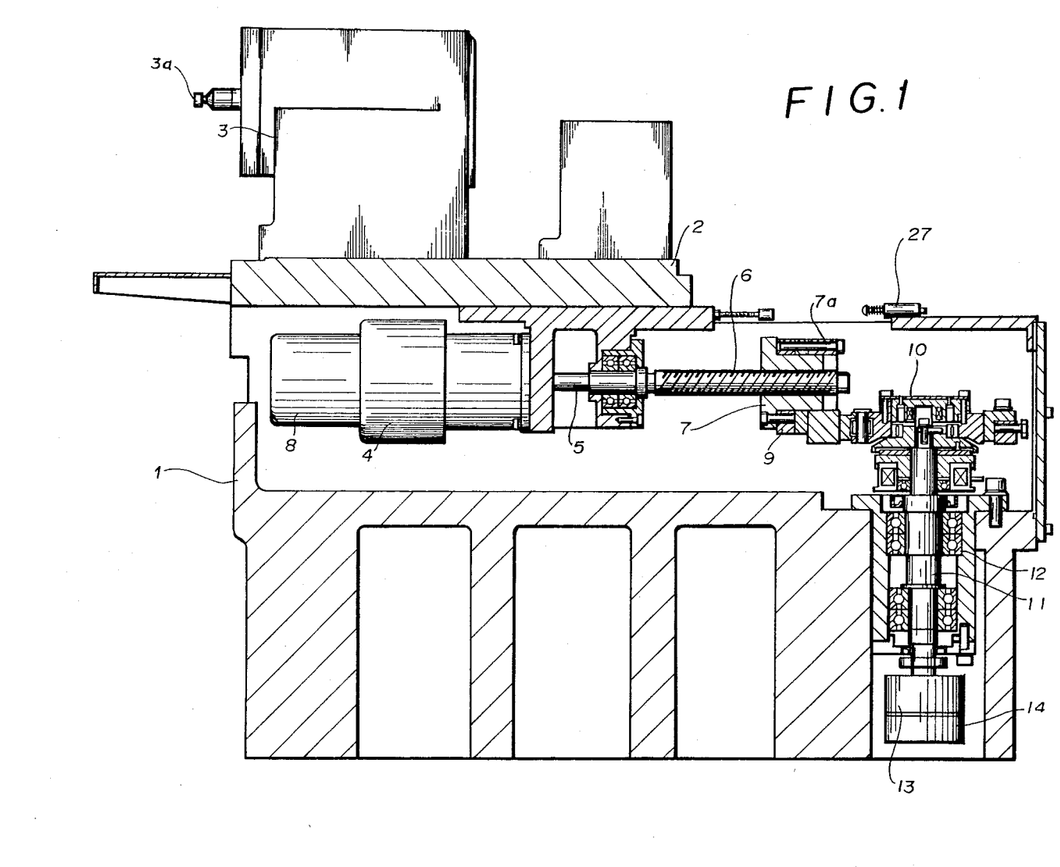
FIG. 1 is a longitudinal cross-sectional view of a first embodiment wherein a table feed apparatus according to this invention is applied to a small internal grinder machine.

In the drawings, 1 is a table base and 2 is a grinder wheel table which is forwardly and/or backwardly slidably mounted upon the table base, and on the upper portion of table 2, a high-frequency spindle motor 3 is mounted and a grinder wheel axle 3a is shown extending therefrom which is faced opposite to a main spindle (not shown). On the under surface of the table 2, a servo-motor 4 for driving the table is secured and on the rotation axis or axle 5 of servo-motor 4, there is provided a ball-screw 6 with a certain lead angle, and the ball-screw 6 meshes with a nut 7 mounted on the table base 1.

Accordingly, as the servo-motor 4 rotates relative to the nut 7 mounted on the table base 1, the grinder table 2 undergoes a reciprocal movement or so-called traverse movement through the ball-screw mechanism such that the table 2 rapidly reciprocates between a stand-by or non-working position and a working position. Furthermore, the servo-motor 4 is provided with an encoder 8 which reads the number of rotations or revolutions of the servo-motor 4, and by an order signal of a control device (FIG. 4), it controls the drive of the servo-motor 4 and effects an accurate traverse movement. The nut 7 is held on a nut holder 7a, and the nut holder 7a is connected to an eccentric cam mechanism 10 via a connecting plate 9.

The said eccentric cam mechanism 10 is comprised of a reciprocation axle 11 rotatably mounted to the table base 1 via a bearing 12, a servo-motor 13 for rotationally driving the reciprocation axle, and an encoder 14 operable to read the rotation position of servo-motor 13. The upper end of the reciprocation axle 11 is connected to the eccentric cam assembly or mechanism 10. Thus, as the servo-motor 13 rotates, it causes the connection plate 9 to be reciprocatably moved through the eccentric cam mechanism 19 and thereby causes the grinder wheel table 2 to undergo the same reciprocation or so-called oscillation movement.

Figure 2:
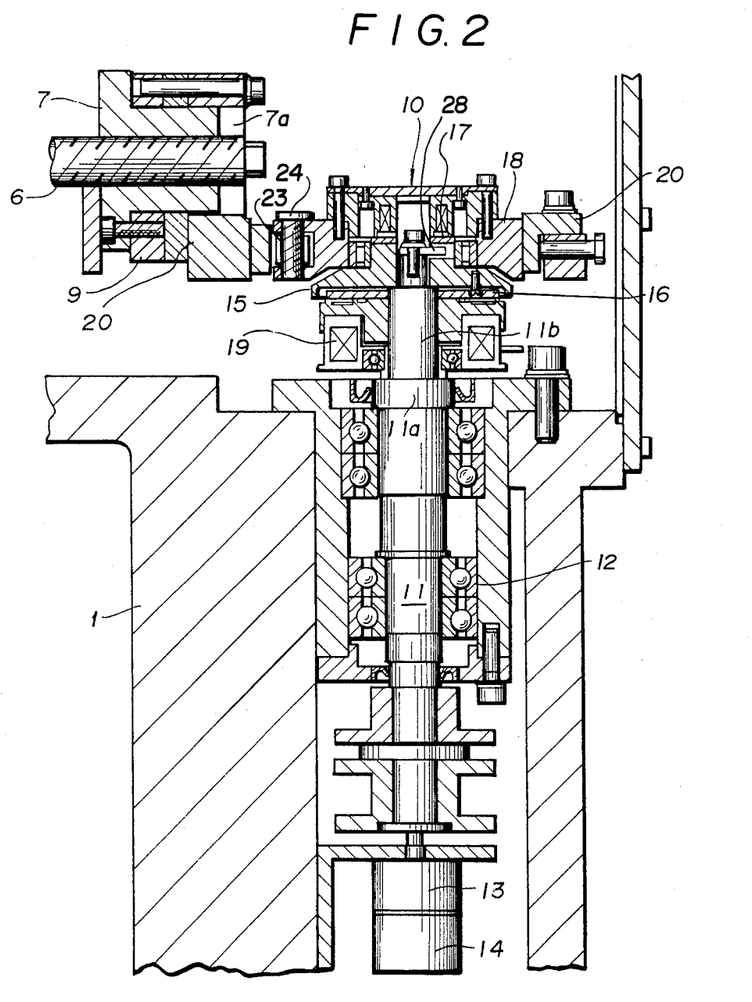
FIG. 2 is a longitudinal cross-sectional view of the eccentric cam assembly.
Figure 3:
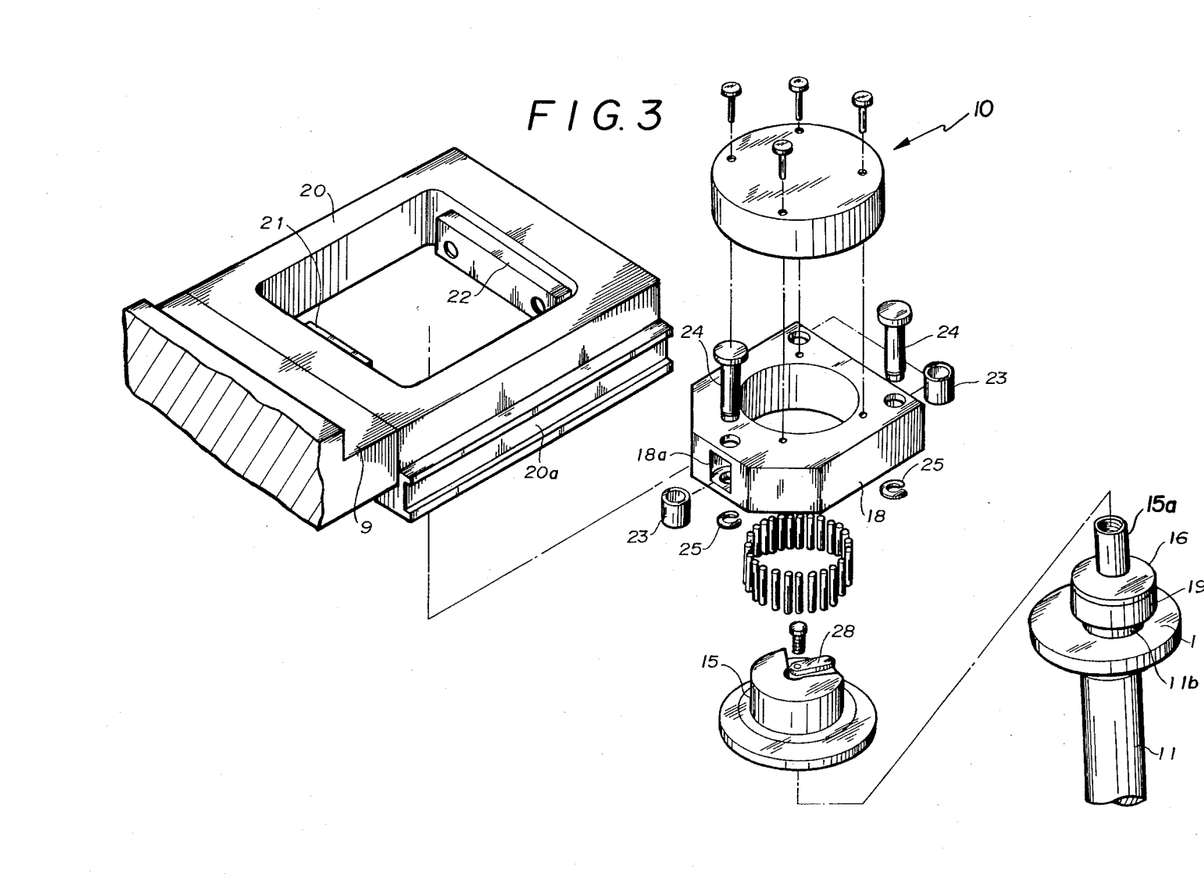
FIG. 3 is a disassembled perspective view of the eccentric cam assembly.

Next, the construction of the eccentric cam mechanism 10 will be explained in detail in accordance with FIG. 2 and FIG. 3.

On the upper end of the reciprocation axle 11, a flange 11a is formed, and on the upper end of flange 11a, a cam axle 11b is integrally provided. As shown in FIG. 3, the cam axle 11b is eccentric by a predetermined amount with reference to the flange 11a. The upper end of the cam axle 11b and a cam plate 15 are coupled through a clutch plate 16 so as to be operable to connect and disconnect therebetween. Cam plate 15 is mounted on cam axle 15a.

In like manner, the cam plate 15 is constructed so as to be connectable and disconnectable to a cam block 18 through a brake plate 17.

By such a construction, when the clutch 19 is charged or activated, the cam axle 11b is connected to the cam plate 15 through the clutch plate 16, and when the clutch 19 is discharged or deactivated, the cam axle 11b is disconnected from the cam plate. In order to connect the cam plate 15 to the cam block 18 through the brake plate 17, the torque of the clutch 19 is predetermined to be greater than the torque of the brake plate 17.

Reference numeral 20 denotes a slide-ring which undergoes a reciprocation movement through action of the cam block 18, and the slide-ring is able to transmit the reciprocation movement thereof to the grinder wheel table 2 via the connection plate 9.

The slide-ring 20 is rectangularly shaped and is formed of guide rail portions 20a on both sides thereof and is linearly reciprocatably transferred along rollers (not shown) provided within the table base 1 and within which a couple of cam follower blocks 21, 22 are provided in the forward and backward direction thereof.

On one end of the cam block 18, one bearing-receiving recess 18a is provided and on the other end thereof, two bearing receiving recesses (not shown) are provided. Within the bearing-receiving recesses 18a are rotatably mounted sleeve bearings 23. The bearings 23 are retained in the bearing-receiving recesses 18a by pins 24 inserted from the upper side of the cam block 18, and the end of each pin is secured by a C-ring 25 such that each pin is rotatably mounted and in such a manner, the outer peripheral portion of each sleeve bearing 23 protrudes a little from the outer surface of the cam block 18. Thus, the cam follower blocks 21, 22 are contacted by the outer portion of sleeve bearings 23 at three points.

In a state when the grinder table 2 advances to its most forward position, as shown in FIG. 1, by the driving of servo-motor 4 for driving the table, if the servo-motor 13 for rotationally driving the reciprocation axle 11 is driven, the cam block 18 reciprocates due to the eccentricity of the cam plate 15 relative to the reciprocation axle 11 and thus it is possible for the grinder table 2 to execute a small oscillation movement.

Figure 4:
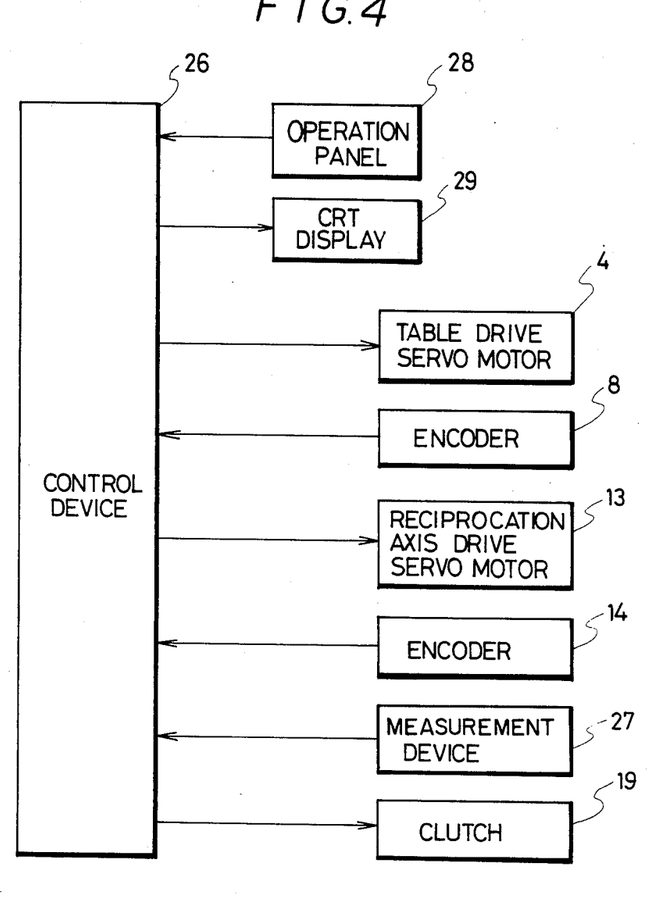
FIG. 4 is a system block diagram of the first embodiment.

Next, a control means of the eccentric cam assembly and a control operation will be explained with reference to the system block diagram of FIG. 4 and the flowchart of FIG. 5.

For the first embodiment of this invention, control is carried by a control device 26 to control the motor 4 which causes a traverse movement of the grinder table 2 and to control the motor 13 for driving the reciprocation axle 11 which causes an oscillation movement of the grinder table 2. The control device 26 consists of a micro computer in which is stored a programmable controller, and thus it is possible to control the initiation and/or stoppage of the driving of the table drive motor 4 and the reciprocation axle drive motor 13.

Further, in this embodiment, the eccentric stroke of the eccentric cam is detected by means of a measurement device 27, and the center point of the eccentric stroke is set as a reference point, and the rotation angle of the servo motor 13 which corresponds to the reference point is memorized within the control device 26 and thereby, the timing control is executed so that the eccentric cam may be stopped at its certain angle as a reference angle when the oscillation operation is stopped.

An operation panel 28 is coupled to the control device 26 and in the operation panel, a number of operating variables, such as a feed of grinder wheel table 2, a traverse amount and speed of grinder wheel table 2, and an oscillation stroke and cycle during the oscillation operation, are set. By operating a numeric key in order to input the desired value of these items, the input data is displayed on a CRT display device 29.

The alteration or adjustment of the grinder wheel table 2 is carried out as follows. In a state when the clutch 19 is discharged or deactivated and the cam axle 11b is thus disconnected from the cam plate 15, the servo-motor 13 is caused to rotate a low speed by a predetermined angle, and when the eccentric amount between the cam axle 11b and the cam plate 15 reaches a desired value, the clutch 19 is charged or activated and thereby, the cam axle 11b is connected to the cam plate 15. A series of data for indicating a mutual relation between the eccentric angle of the eccentric cam and the eccentric stroke has previously been input within the control device 26, thus the cam axle 11b is caused to rotate by a certain angle to thereby exert a desired eccentric stroke.

Figure 5:
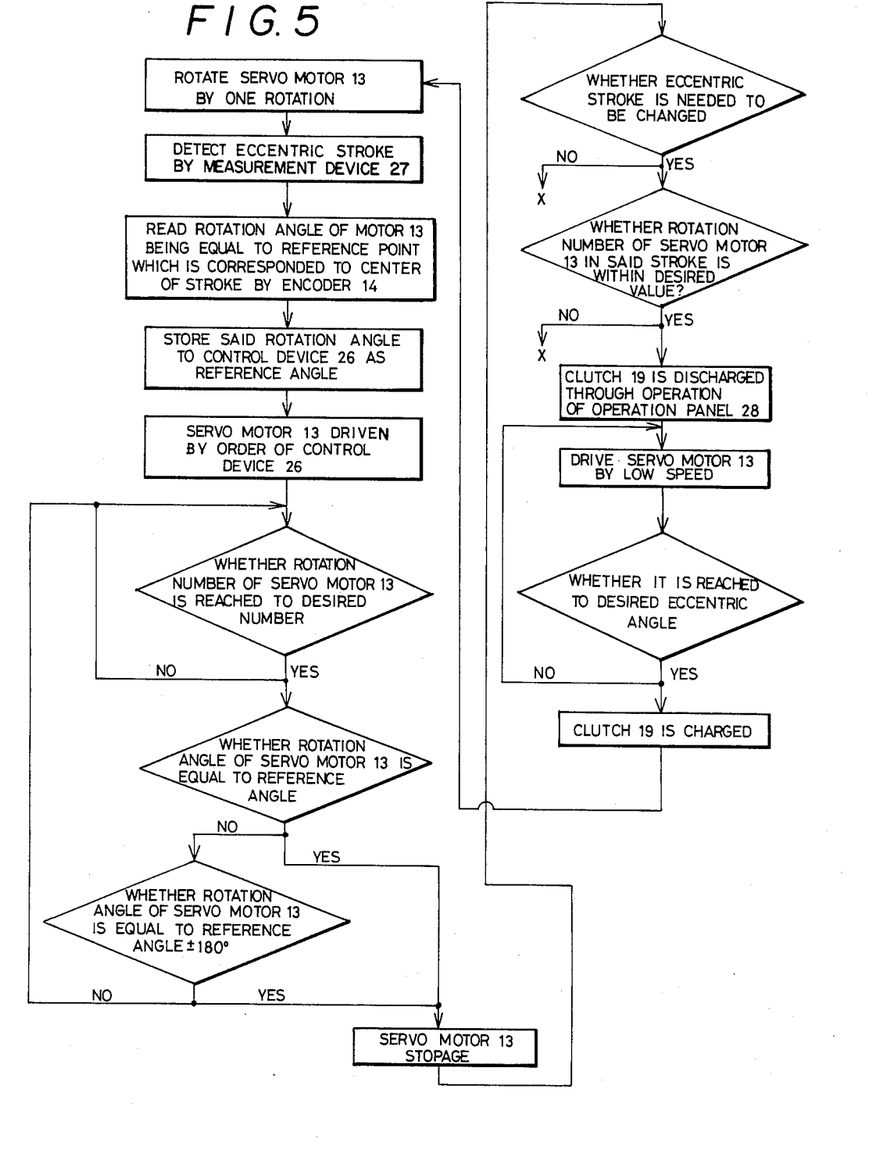
FIG. 5 is a flow-chart thereof.

Accordingly, as shown in the flow-chart of FIG. 5, the conrol device 26 rotates the servo-motor 13 by one rotation and it detects the eccentric stroke of the eccentric cam by means of the measurement device 27. In addition, it supposes a center point of eccentric stroke as a reference point, and it reads a rotation angle of the servo-motor 13 which corresponds to the reference point which is then stored in the control device 26.

Thus, the servo-motor 13 is driven in accordance with an order or command from the control device 26 and the grinder table 2 undergoes an oscillation movement during a predetermined time in accordance with the rotation movement of the cam plate 15. The encoder 14 reads the rotation number of the servo-motor 13 and after the oscillation operation is continued for the desired time, the servo-motor 13 stops due to an order from the control device 26 and thus the oscillation movement of the grinder table 2 stops. The timing order of stoppage is generated from the control device 26 so that the same occurs when the angle of the servo-motor 13 reaches the angle corresponding to the preselected reference point.

The alteration operation or adjustment of the oscillation stroke of the eccentric cam is carried out as follows.

The clutch 19 is discharged through operation of the operation panel 28 and in accordance with a series of datum for indicating a relation between an eccentric angle and an eccentric stroke, the control device causes the cam axle 11b and the reciprocation axle 11 to rotate by a certain angle corresponding to a desired stroke in response to the rotation of servo-motor 13. The clutch 19 is charged successively through operation of the operation panel 28, and the cam axle 11b is caused to connect to the cam plate 15 and thus, a desired eccentric stroke can be obtained.

Thus, the cam plate 15 is normally restrained to the reference position and so, the grinder table 2 is accurately positioned at its stop position. In the case of adjusting the oscillation stroke of the cam plate 15, by operating the operation panel 28, it is possible to automatically control the oscillation stroke thereof, and it becomes extremely easy to control the oscillation stroke in comparison with the prior art.

Figure 6:
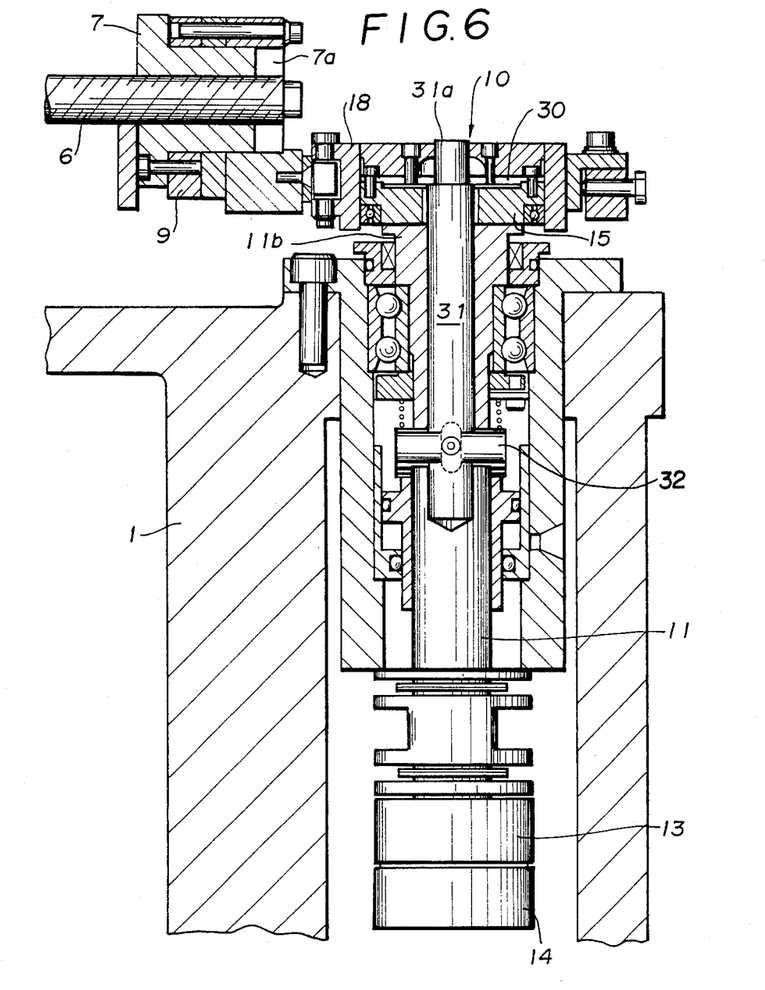
FIG. 6 is a longitudinal cross-sectional view of the main part of a second embodiment to which this invention is applied.

Next, a second embodiment of this invention will be explained in accordance with FIG. 6.

Like parts as in the first embodiment are designated by the same reference numbers and so description thereof is omitted.

This embodiment employs a magnetic clutch as a clutch assembly for connecting and disconnecting a cam axle with a cam plate in a case where alteration of the oscillation stroke is desired, but this embodiment employs a diaphragm as a clutch assembly.

A diaphragm chuck 30 is operable to alternatively connect and disconnect either a cam axle 11b and a cam plate 15 of the cam plate 15 and a cam block 18. The operation of the diaphragm chuck 30 is carried out by use of a rod cylinder 31 which goes back and forth in response to operation of a solenoid 32. When the oscillation stroke of the eccentric cam is intended to be altered, the solenoid 32 is energized or charged and the rod 31a of the rod cylinder 31 advances forward (upward in FIG. 6) and thereby, the cam axle 11b is released from the cam plate 15. When the cam axle 11b thereafter rotates by a certain rotation angle and the cam plate 15 reaches a desired eccentric angle position relative to the cam axle 11b, the solenoid is deenergized or discharged and the rod 31a of the rod cylinder 31 retreats (downward in FIG. 6) and thereby, the cam axle 11b is connected back to the cam plate 15 and exerts an oscillation operation with a desired eccentric stroke due to the driving of the servo-motor 13.

Additionally, in the first and second embodiments, the servo-motor 4 for driving the table is secured under the grinder wheel table 2 and the nut 7 which engages with the ball-screw 6 is alternately mounted upon the inner side of the table base 1, but it is possible that the nut be secured under the grinder wheel table and the servo-motor for driving the table be mounted upon the side of the table base 1. The foregoing and other changes in the table feed device can be made appropriately by those skilled in the art.

As described and set forth above, the table feed apparatus due to this invention employs a servo-motor and ball-screw assembly in order to drive the traverse movement of a grinder wheel table and employs an eccentric cam assembly in order to effectuate the oscillation movement of the table such that it becomes possible both to carry out a low speed feed operation, which is especially useful in an internal grinder machine and the like, and to carry out a high speed oscillation operation. Thus, the flexibility of grinder processing is extremely improved.

In cases where the oscillation operation is performed with the prior art eccentric cam assembly, it is impossible to accurately position the grinder wheel table during stoppage of the oscillation operation. But, due to this invention, by causing the eccentric cam to stop at a predetermined angle, it is possible to always position the table at an accurate position during stoppage of the oscillation operation and to automatically alter the oscillation stroke of an eccentric cam by use of a clutch assembly which allows the eccentric cam to be connected and disconnected such that it is extremely simplified to accurately position a table and to control the oscillation stroke. Thus, this invention is extremely practical and especially applicable to the internal grinder machine.

What is claimed is:

1. A table feed apparatus of the type which converts rotation of a table drive motor into reciprocal movement of a grinder wheel table through a ball-screw assembly to thereby impart a traverse movement to said grinder wheel table between a non-working position and a working position and which converts rotation of a reciprocation axle drive motor into reciprocal movement of said table through an eccentric cam to thereby impart an oscillation movement to said grinder wheel table when the table is in the working position; characterized in that said eccentric cam comprises a cam axle eccentrically extending relative to the axis of rotation of the reciprocation axle drive motor, a cam block slidably connected to an outer surface of said cam plate, a slide-ring, a clutch assembly for effecting connection and disconnection between said cam axle and said cam plate and operative when said axle and plate are connected together to convert said rotation of said cam plate into oscillation movement of the grinder wheel table through the cam block and said slide-ring, and means for effecting adjustment of the amount of eccentricity of said eccentric cam by rotating the cam plate relative to the cam axle by a desired rotation angle;

and drive control means for said eccentric cam comprised of an encoder secured on the reciprocation axle drive motor so as to read the rotation angle of said drive motor, a measurement device for detecting the amount of eccentricity of said eccentric cam, and a control device for controlling rotation of said reciprocation axle drive motor, said drive control means being capable of stopping the eccentric cam at a predetermined angle as a center position of eccentricity in response to a command from said control device and in response to the output of the measurement device, said drive control means also being operable to operate said clutch assembly so as to connect or disconnect to cam plate with the cam axle and thereby to automatically alter the amount of eccentricity of said eccentric cam.

2. A table feed apparatus according to claim 1, wherein said clutch assembly comprises a clutch plate operable to connect and disconnect the cam axle with the cam plate in response to the clutch assembly being charged or discharged, and a brake plate operable to cause the cam plate to connect to the cam block.

3. A table feed device according to claim 1, wherein said clutch assembly comprises a diaphragm chuck operable through a rod and rod cylinder to alternatively connect and disconnect said cam plate to said cam block and said cam axle.

4. A table feed apparatus according to claim 2, wherein the means for effecting adjustment of the amount of eccentricity of said eccentric cam includes means in said clutch assembly for disconnecting said clutch plate from said cam plate to thereby release said cam plate from said cam axle, and means for advancing said cam plate to a desired eccentric angular position during the time when the cam plate is released from said cam axle.

5. A table feed apparatus according to claim 3, wherein the means for effecting adjustment of the amount of eccentricity of said eccentric cam includes means for advancing said rod cylinder to a point where said cam axle is released from said cam plate, and means for detecting when said cam axle has rotated to a desired angle of rotation such that the cam plate comes to a desired eccentric angular position during the time when the cam plate is released from said cam axle.

6. A table feed apparatus comprising: a table mounted to undergo sliding movement between a stand-by position and a working position; first drive means for driving the table between the stand-by and working positions; second drive means for reciprocatingly driving the table while the table is in the working position, the second drive means comprising a controllable rotary motor for producing a rotary output about a given axis of rotation, an eccentric cam, means mounting the eccentric cam for rotational eccentric movement about the given axis of rotation, clutch means for releasably coupling the rotary motor to the eccentric cam so that the rotary output movement of the rotary motor effects rotational eccentric movement of the eccentric cam, and means for converting the rotational eccentric movement of the eccentric cam into reciprocating movement of the table; and control means for controlling the operation of the rotary motor to stop the rotation thereof after a preselected number of reciprocating movements of the table, the control means including means for stopping the rotation of the rotary motor such that the eccentric cam stops its rotational eccentric movement at a predetermined angular position.

7. A table feed apparatus according to claim 6; wherein the means for stopping comprises means for detecting the eccentricity of the eccentric cam, and means for stopping the rotation of the rotary member in response to the detected eccentricity.

8. A table feed apparatus according to claim 6; wherein the means for stopping comprises means for detecting the eccentricity of the eccentric cam and producing an output signal corresponding to the detected eccentricity, means responsive to the output signal for storing data representative of the angular position of the rotary motor corresponding to the detected eccentricity of the eccentric cam, and means for controlling the operation of the rotary motor in accordance with the stored data.

9. A table feed apparatus according to claim 8; wherein the means for detecting comprises means for detecting the center point of the eccentric stroke of the eccentric cam and producing an output signal corresponding to the detected center point.

10. A table feed apparatus according to claim 6; wherein the control means for controlling the operation of the rotary motor comprises means for detecting the number of revolutions of the rotary motor, and means for stopping the rotation of the rotary motor when the detected number of revolutions corresponds to the preselected number of reciprocating movements of the table.

11. A table feed apparatus according to claim 6; wherein the means mounting the eccentric cam includes means mounting the eccentric cam to enable adjustment of the eccentricity thereof with respect to the given axis of rotation.

* * * * *